United States Patent [19]
Hall

[11] 3,796,549
[45] Mar. 12, 1974

[54] AIR SCRUBBER APPARATUS

[76] Inventor: Trenton O. Hall, 6500 N.E. 2nd Ave., Miami, Fla. 33138

[22] Filed: Mar. 22, 1972

[21] Appl. No.: 237,073

Related U.S. Application Data

[63] Continuation-in-part of Ser. No. 92,822, Nov. 25, 1970, abandoned, and a continuation-in-part of Ser. No. 195,170, Nov. 3, 1971.

[52] U.S. Cl.............. 23/277 C, 23/284, 23/262, 126/299 A, 98/115 K, 55/228, 55/DIG. 36, 261/17, 261/111, 110/8 A, 431/326, 431/5
[51] Int. Cl. ............................................. F23g 7/06
[58] Field of Search....... 23/277 C; 126/299, 299 A; 431/326, 328; 98/115 K; 55/DIG. 36, 228, 229; 261/108, 109, 110, 111, 115

[56] References Cited
UNITED STATES PATENTS

| | | | |
|---|---|---|---|
| 2,653,674 | 9/1953 | Ortgies | 23/277 C |
| 3,407,879 | 10/1968 | O'Rear | 169/42 X |
| 3,084,736 | 4/1963 | Mentel et al | 431/329 |
| 3,613,333 | 10/1971 | Gardenier | 55/228 X |
| 3,405,690 | 10/1968 | Burrus et al. | 431/22 X |

*Primary Examiner*—James H. Tayman, Jr.
*Attorney, Agent, or Firm*—Fleit, Gipple & Jacobson

[57] ABSTRACT

An improved air scrubber apparatus with fire extinguishing means comprising a primary scrubber assembly, a burner assembly adapted to be connected to said primary scrubber assembly and a secondary scrubber assembly adapted to be connected to said burner assembly. The primary scrubber assembly comprises a housing having spray means mounted therein, the spray means being connected to a source of fluid and adapted to discharge the fluid in spray form to clean and cool gases passing through the scrubber housing. The burner assembly comprising a housing adapted to be mounted on the primary scrubber assembly and has heat producing means mounted thereto. The secondary scrubber assembly comprising a housing having spray means connected and mounted therein.

10 Claims, 9 Drawing Figures

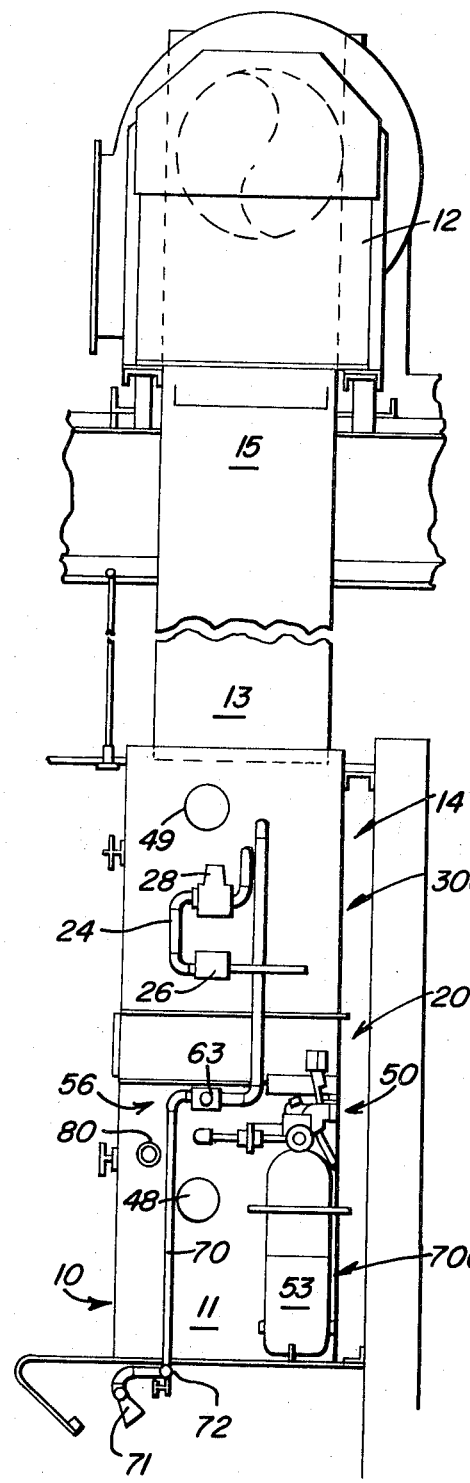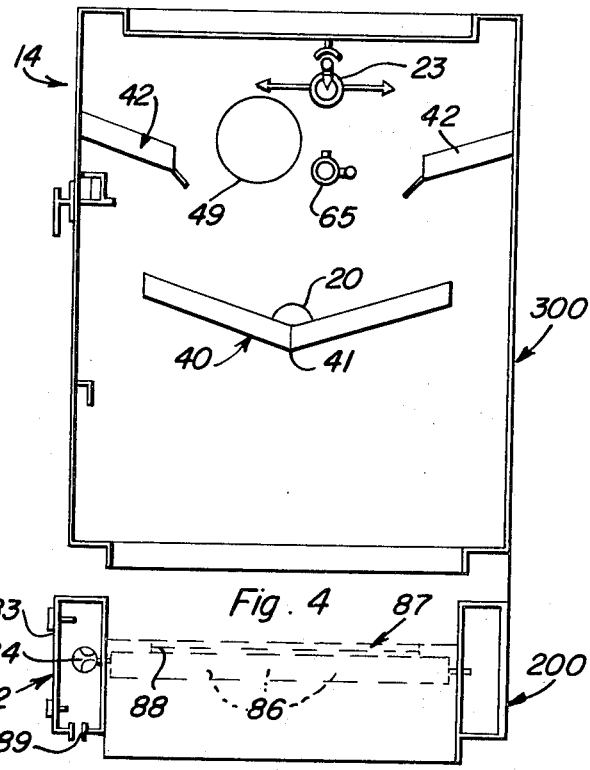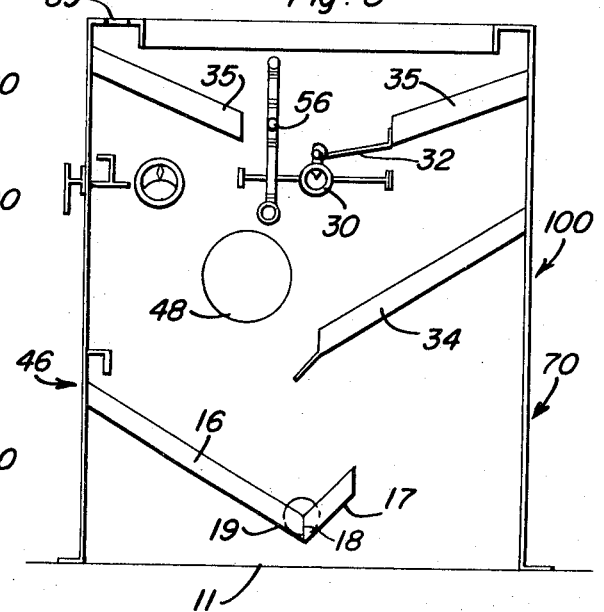

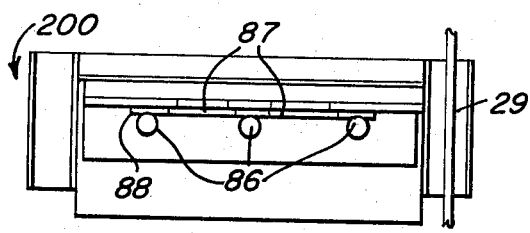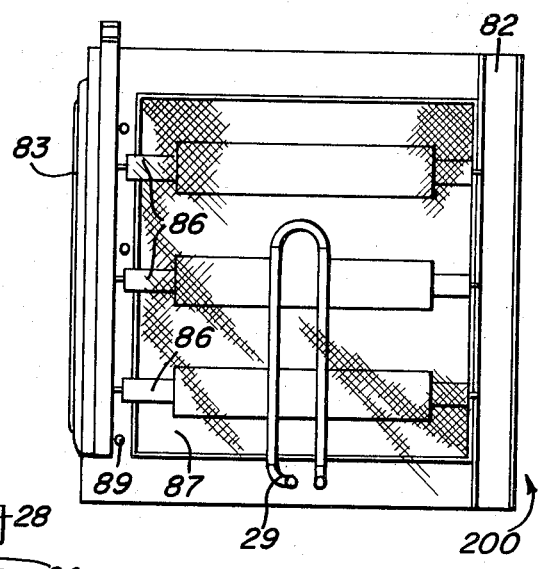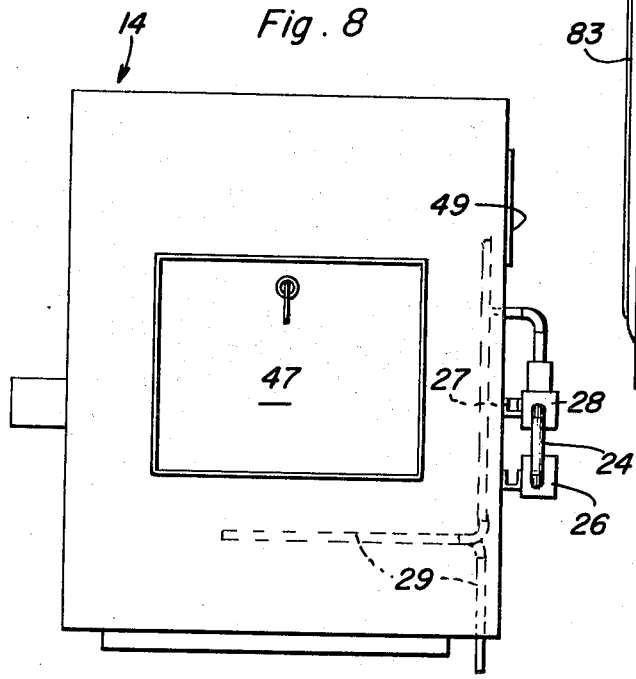

AIR SCRUBBER APPARATUS

This application is a continuation-in-part of application Ser. No. 92,822 filed Nov. 25, 1970, now abandoned and application Ser. No. 195,170 filed Nov. 3, 1971.

The present invention generally relates to an improved air scrubber apparatus and more specifically to a sectional interchangeable fluid cleaning apparatus which cleans contaminated gases arising from a cooking surface. The gases are cleaned by passing the polluted gases through a fog blanket of fluid spray to remove solid matter and pollutants contained therein, subjecting the cleaned gas to heat treatment and cooling the heated gas.

Moreover, the present invention is specifically envisioned as being used in connection with cooking apparatus so that smoke, grease, cooking odors and other condensable cooking contaminants emanating from a cooking surface pass through the apparatus and are removed therefrom allowing clean air to be dispensed into the atmosphere. This cleaning and cooling is accomplished by passing contaminated gas through a fog blanket discharged by spray means mounted in the apparatus. After being initially cleansed the gas passes through a heated area and a spray cooling area. In the invention the contaminated gas passes through the primary scrubber section where it is cleaned, by entraining the contaminate particles in the spray droplets discharged by the spray means. The spray droplets are carried downward by gravity to the baffle means mounted in the primary scrubber housing and are directed by the baffle means to a suitable waste depository.

When the heated grease, condensable contaminants and/or other particles contact the fog blanket produced by the spray means in the primary scrubber a steaming occurs, thus further atomizing the grease and condensable contaminants.

The gas having been initially scrubbed rises due to its heated nature into the heating or burner assembly which burns any smoke or material which may have escaped the first cleaning fog blanket. The superheated cleaned gas then rises into a secondary scrubber housing having spray means which provide a second spray blanket which acts to remove any particles which may have escaped the initial fog blanket and burning action, but primarily functions to cool the heated gas thus eliminating thermal-pollution.

The construction of the invention allows any one of the three sections to be stacked in any order with regard to the other sections so that any combination of sections can be used to effect a quick and highly effective elimination of the impurities contained in the gases, thus preventing the impurities from being deposited in the atmosphere outside the building in which the air scrubber is located.

The primary function of the improved air scrubber is to eliminate air contamination pollution and thermal-pollution and thus preserve the environment.

There are many air contaminate and grease cleaning devices known in the prior art, but these devices are cumbersome and expensive to construct. While these known devices include apparatus for washing or collecting grease, it is extremely difficult to clean the interior of the devices and, due to the stringent fire regulations of many states and the standards set forth by fire insurance underwriters, these known devices have insufficient fire-extinguishing means so that they cannot be used in all sections of the country.

In addition, these prior devices are unable to thoroughly cleanse the smoke and grease particles out of the gases which pass therethrough.

Examples of prior art devices are shown in U.S. Pat. No. 2,813,477, 3,433,146 and 3,490,206. It should be noted however, that these patents primarily utilize outside spray or damper means for fire extinguishing purposes.

The present invention thus provides an improved air scrubber which can be manufactured efficiently and economically with an automatic fire-extinguishing system, while at the same time being continuously self-draining with the feature that the temperature of gases discharged therefrom are reduced. In addition, the fire-extinguishing system which is connected thereto reduces the danger of the likelihood of fire and provides a simple means for extinguishing fires in the apparatus if any should arise.

Other advantages and embodiments of the invention will become apparent from the following detailed description and upon reference to the accompanying drawings.

BRIEF DESCRIPTION OF THE DRAWINGS

FIG. 2 discloses a side elevational view of the air scrubber invention shown in FIG. 1.

FIG. 3 discloses an enlarged side view of the primary scrubber section of the invention with a housing wall removed.

FIG. 4 discloses an enlarged side view of the burner assembly section of the invention with a housing wall removed.

FIG. 5 discloses an enlarged side view of the secondary scrubber section of the invention with a housing wall removed.

FIG. 7 discloses an enlarged front elevational view of the burner assembly section of the invention.

FIG. 8 discloses an enlarged front elevational section of the secondary scrubber section of the invention.

FIG. 9 shows a plan view of the burner assembly section shown in FIGS. 4 and 7.

DETAILED DESCRIPTION OF THE DRAWINGS

Figure 1:
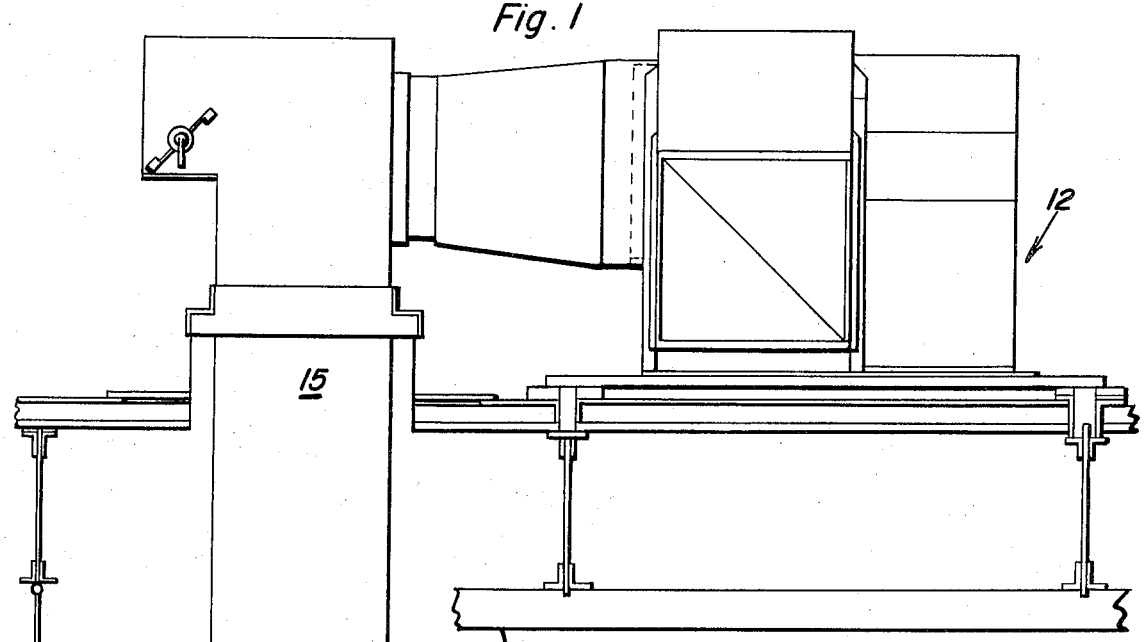
FIG. 1 shows a front elevational view of the air scrubber invention.
Figure 6:
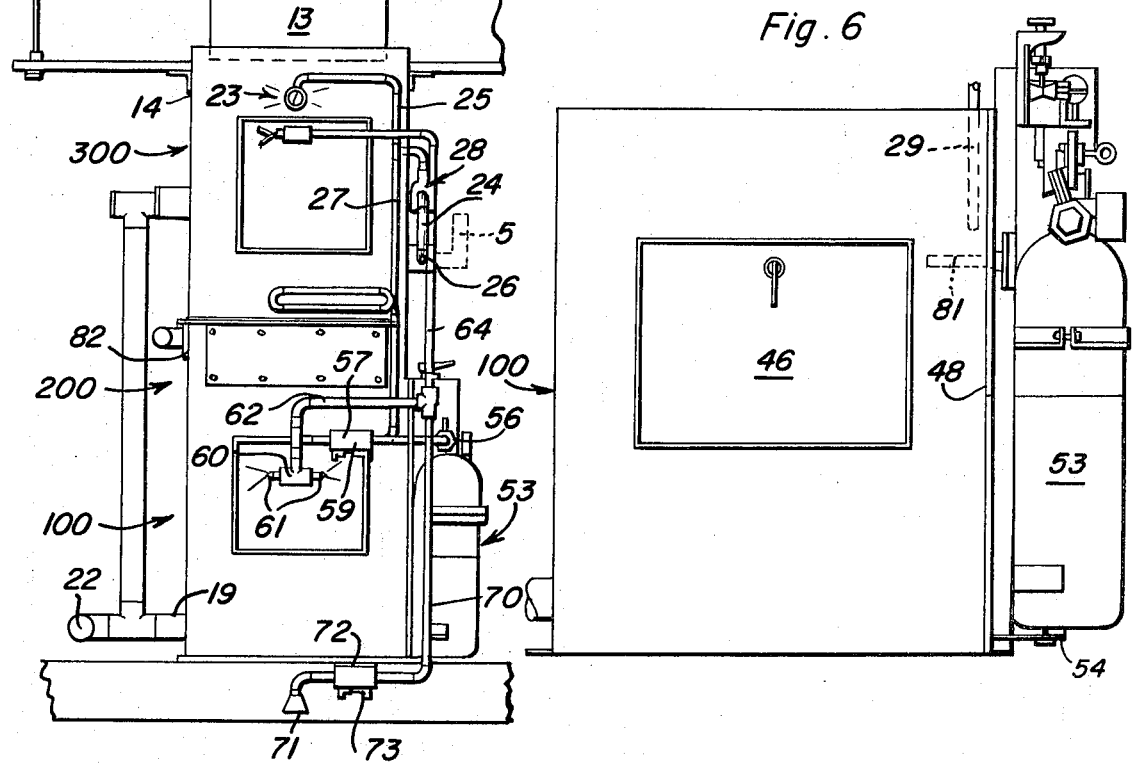
FIG. 6 discloses an enlarged front elevational view of the primary air scrubber section of the invention.

The improved air scrubber apparatus as disclosed in FIGS. 1–9 comprises a sectional housing having a gas inlet 11 and a gas outlet 13. The apparatus is preferably constructed of three sections comprising a primary scrubber section 100, a burner assembly section 200 and a secondary scrubber section 300. These sections are adapted to be mounted over a cooking appliance, such as a broiler, frying plate or french fryer. The housing of each section is preferably constructed of stainless steel, but any other suitable material can be used.

The improved air scrubber apparatus is constructed to purify, clean and cool gases emanating from a cooking or heating surface. Such gases generally carry contaminants such as grease, smoke, fumes or other materials. The improved air scrubber preferably cleans the contaminant bearing gases by directing the gases through a spray blanket, a heated area and second spray blanket. The cooled, cleaned gases pass from the top of the housing through the gas outlet 13 up into a vertical exhaust duct, which discharges the cooled purified gases into the atmosphere.

The air scrubber apparatus is preferably of a general rectangular construction, having three sections; a primary scrubber section 100, a burner assembly section 200 and a secondary scrubber section 300 each of which preferably have a rectangular cross section. The sections can be placed in a mounted relationship to each other while allowing the rotation of any one of the housing sections to fit any desired application. If desired, housing sections of a circular or angular construction, can be used within the scope of the invention. The inlet 11 of the scrubber apparatus takes in gases emanating from the cooking appliances or food stuffs being cooked below while the other end of the apparatus has a discharge outlet 13 which is adapted to be connected to a discharge duct 15. The discharge duct can extend into the atmosphere outside the building in which the apparatus is located or to an exhauster.

If desired an exhauster can be used in connection with the vertical exhaust duct to discharge the gases. In the preferred embodiment, a suitable means of exhaust is accomplished by a vent typical to that manufactured by Clima-King, Inc. entitled Series BVB. This vent generally comprises a one piece construction belt driven with a backward inclined centrifugal wheel and drive compartment with weather covers. A fan, blower or centrifugal upblaster could be adapted to be used in place of the above mentioned exhaust, if such is desired. The primary scrubber section 100 preferably comprises a housing 10 having baffle plates or members secured to its inner surface at the rear wall and/or sidewall. These baffle plates project inwardly from the housing walls to define a substantially serpentine path for the flow of gases and entrained particles rising from the broiler or cooking area. Means are provided in the primary scrubber section 100 to carry fluid condensed from the spray or fog blanket discharged by spray means mounted in the housing down a predetermined path into a drain system. The initially cleaned gases pass upward through a burner assembly section 200 which acts as a smoke eliminator in the apparatus. The heat from the burner assembly provides an effective means of consuming any smoke contained in any gaseous vapors which have passed through the primary scrubber section 100. The thermally heated cleansed gas passes through a secondary scrubber section 300 which cools the gas and additionally provides a secondary cleaning action to remove any additional particles or contaminants which may have escaped the primary scrubber and burner assembly. Baffle means is also provided in the secondary scrubber section 300 to define a serpentine path for the flow of gases with means being provided in the secondary chamber and carry fluid condensed from spray means down a predetermined path into a drain system.

In the apparatus the contaminated gas rises up into a hood or back shelf canopy over the cooking appliance and enters the gas inlet 11 where it contacts the bottom surface of a baffle member 16 secured to housing 10. The baffle member 16 effects an approximate 90° change in the direction of the flow of the gas. The gas flow direction again changes when the contaminated gas flow passes from the bottom surface of baffle members 16 to the bottom surface of baffle member 34 or flows directly upward to contact baffle member 34. After contacting baffle 34 the gas assumes its original path upward in the original direction of flow. The centrifugal action resulting from the gas flow reversal causes some of the condensable grease and oil entrained in the gas stream to be deposited on the baffle surfaces, thereby providing an initial extraction stage. Additional upper baffle members 35 are secured to the primary scrubber housing 10 to cause additional gas directional change after the gas has passed through a blanket of fluid particles deposited by the spray means 30.

The baffle members 16, 34 and 35 can be secured to the inner sides of the primary scrubber housing 10 at any angle with respect to the walls of the housing as is desired. The lower end of the baffle member 16 is preferably constructed with an angular extension 17 which forms an inclined trough 18, which gathers liquid and particles entrained in the liquid which have condensed on the baffle member surfaces and guides the liquid along the trough path to a drain conduit 19 which is in turn connected to a wasteline conduit 21.

The drain conduit 19 is preferably constructed of copper or some other heat transfer material so that it will not have grease forming on its interior surface because the heat of the rising gases will keep the grease and particles entrained in the fluid until the fluid is drained off. A fluid spray means 30 is supported by and connected to housing 10 by bracket 32 which is preferably mounted on baffle member 35.

The fluid spray means 30 is designed to discharge a spray of fog which forms a blanket or filter through which the gas from the heated surface must pass on its way through the apparatus. The spray droplets in the fog blanket serve as vehicles for collecting and carrying impurities in the gas and cooling the heated gas and are pulled by gravity to the baffle surfaces where it collects, condenses and is carried to a suitable point of discharge.

The spray comes from water or other fluid which has been heated before discharge from the spray means 30. In the apparatus water or some other fluid is fed into the system at source S. Preferably the main water supply source runs along the center of the building and is connected with a solenoid means 26, mounted on the housing 14 of the secondary scrubber section 300.

The solenoid means 26 preferably is connected with the broiler on the cooking surfaces or with a fuel feed to the cooking appliance so that when the cooking appliance is activated the solenoid means 26 is likewise activated. The solenoid means 26 preferably comprises a valve which closes or opens the conduit, thus allowing water to flow through a copper conduit 24. Solenoid means 26 is connected by conduit 24 to a pressure regulator valve 28 which preferably regulates the water pressure exiting therefrom at 25 pounds per square inch. If desired, the solenoid means 26 can be connected to a detergent source so that detergent can be added to the water for periodical cleaning. After being regulated by pressure regulator 28 the water travels along a tee connecting conduits 25 and 27 which lead to the secondary scrubber spray means 23 and serpentine loop 29 respectively. The serpentine loop 29 is located directly over the burner assembly 200 and extends down to the nozzle of spray means 30. The intense heat associated with the burner assembly 200 and which will be later described in a description of the burner assembly raises the temperature of the water passing through the serpentine loop 29 so that at the point where it is discharged from spray means 30 in the inner surface of primary scrubber section 100, the temperature is somewhere in the range of 140°–180°F. This water temperature efficiently extracts the grease laden gaseous vapors which arise from the working surface. The spray means 30 is preferably constructed so the adjustable brass nozzle fogger discharges the heated water in a spray forming a fog blanket. The spray from the nozzle fogger against the side of the primary scrubber housing 10 provides a cleaning action. The heated spray when discharged forms a blanket in the center of the housing 10 so that when the grease and soot laden gases pass through the water spray blanket particles of grease, carbon and other material are entrained on the water droplets while at the same time the temperature of the heated gases are cooled. The action of gravity and force of discharge of the spray means 30 causes the fog droplets to fall on baffle members 16 and 34 which direct the flow of condensate over their upper surfaces into trough 18 which is connected to a copper drain line 19. The baffle members form a combination air baffle and fluid baffle with the fluid carrying being accomplished by the upper surface of the baffles and the trough and the air direction being accomplished by positioning the baffle members to force the particle-laden gas to follow a serpentine path so that heavier contaminable particles such as grease are partially separated from the gas at the angular turns due to the directional air change and change in velocity. As fluid flows down the baffle members and trough 18, it is directed to the drain line 19, and corresponding drain 21 whereupon it is diverted into proper sewerage or other adequate disposal units.

The trough shape and drains of the baffle members in the primary and secondary sections prevent drainage from the respective spray means from dripping or flowing off the edges of the trough so that the heated gases rising from the cooking surface or burner assembly do not break up the liquid in the trough and lift the liquid into the upper portion of either the primary scrubber or the secondary scrubber. The liquid condensate is then drained off leaving the upper parts of the apparatus relatively clean. Deflector plates or baffles 35 are placed at the top of the primary scrubber housing 10 and are secured to the sides of the housing to form a passage causing the initially scrubbed heated air to flow in a serpentine path in the housing up to the burner assembly. The deflector baffles 35 prevent almost all of the water from passing up through the burner assembly 200.

A viewing lens or window 48 as shown in FIG. 3, is also provided in housing 10 so that the interior of the housing can be viewed from outside to determine if the apparatus is correctly functioning. An access door 46 is located in the housing for maintenance and inspection.

Mounted in the upper portion of the housing preferably above baffles 16 and 34, is a glass encased thermometer means 80 which allows a temperature reading to be made in the primary scrubber housing 100. The thermometer means is utilized primarily to determine if the spray means 30 has been blocked by dirt or other foreign particles carried into it by the incoming fluid. If there is a blockage in the nozzle of the spray means, a rise in temperature will occur. Thus, the thermometer means 80 including thermometer 81 is used as an indicator that something is wrong with the spray means 30.

Tests have shown that the temperature at the bottom of the scrubber apparatus around inlet 11 can run around 900°F., but the temperature above the fog blanket produced by the spray means 30 is approximately 225°–250°F. It is apparent that any decrease in the fog blanket will result in an immediate temperature rise. If desired, an acoustic or light signal can be attached to the thermometer means 80 for automatic activation when the temperature reaches a predetermined degree. A 50°–500°F. thermometer is preferably used in connection with the air scrubber body in this system. A container 53 of a fire-extinguishing chemical, which is preferably of the dry pressurized type is secured to the primary scrubber housing 10 by support brackets 54. A conduit 56 leads from the chemical container 53 to the upper portion of housing 10 where it is mounted inside the housing 100.

The conduit 56 is connected to an extinguishing system venturi which is used to divert the fire-extinguishing material from the container towards tee 60, which serves as a distribution head for extinguisher nozzles 61 inside housing 10 and/or a conduit 62 which has its other end terminating in a venturi 63. The venturi 63 serves to divert the fire-extinguishing material along supply conduit 64, which leads to extinguisher duct nozzle assembly 65 in the secondary scrubber housing 14, or along supply conduit 70, which leads to the surface protection extinguisher nozzle assembly 71, which is positioned below the primary scrubber housing 10 to discharge fire-extinguishing material directly on cooking surfaces.

The scrubber extinguishing nozzles 61 are preferably constructed to automatically discharge an extinguishing material towards the sides of housing 10 when a fire or high temperature occurs in the housing 10. The fire extinguisher system can be automatically activated by a thermal link assembly or by manual release lever, if a fire is discovered before the thermal link assembly has time to function. In the invention three thermal link assemblies are preferably used.

The primary scrubber section automatic thermal link assembly 57 used with the invention is preferably mounted somewhere near the center section of housing 10 between conduit 56 and venturi 58. The assembly 57 can comprise, if desired, a cable connected to the release handle at the control head 50. The cable which is positioned inside conduit 56 terminates on a fusible link 59 held in place by the thermal link assembly 57.

A similar thermal link assembly 72 is provided for spray nozzles 71 to give fire protection to the cooking surface. The automatic thermal link assemblies 57 and 72 are constructed so that they are spring activated with projections on the two opposing parts of the bases of assemblies 57 and 72 being connected together by fusible links 59 and 73 respectively. The fusible link 59 preferably has a 360°F. melting point while the fusible link 73 preferably has a somewhat higher melting point. When a predetermined amount of heat rises up into housing 10 and contacts fusible link 59 the fusible link will melt causing the opposing parts of the activator to be disengaged from each other thus activating the system.

When the system is activated the pressurized container 53 will cause fire extinguishing chemicals or materials to flow through nozzles 61 and/or 71 and be sprayed into the interior of primary scrubber housing 10 or to the cooking surface 400, thus, putting out any fire. As fusible link 59 is positioned above the spray means 30, it is not affected by the heat of the various cooking operations and only responds to flame temperature in the housing 10.

Seated upon the primary scrubber housing 10 is a burner assembly housing 82. The burner assembly section 200 is designed as an integral component of the air scrubber and acts as a smoke eliminator. The heat from the burner assembly is utilized as an effective means of consuming the smoke contained in any gaseous vapors which have not been scrubbed out of the gases by the primary air scrubber.

The burner assembly housing 82 contains an access door 83 for periodic maintenance and inspection. A burner means comprising a burner manifold 84, burner tubes 86, a gas feeder supply line and screening 87 is mounted to the housing.

A high temperature incoloy screening 87 is connected to the burner tubes 86. When the cooking gas passes through the primary scrubber section 100 it passes into the burner assembly where the gaseous vapors come into contact with the incoloy screen 87 which is secured to one-eighth inch stainless steel plates 88 which are in turn secured to burner tubes 86. The effect of the heat emanating from the burner tubes 86 causes the incoloy screen to convey the heat over the entire exposed inside surface area available for gaseous vapors passage, thus allowing no possible escape of smoke particles. The result is a total consummation of the smoke particles. This incoloy screen type 87 is meshed preferably of a type similar or equivalent to the one manufactured by International Nickel and is labelled "Incoloy 800" 4 mesh 0.220 wire.

A plurality of passages or holes 89 are provided in the burner assembly housing 82 and primary scrubber housing 10 as shown in FIGS. 3 and 4 to allow combustion air to pass to the manifold 84. This air has its origin at the primary air scrubber. The bottom end of the burner assembly is preferably constructed so that it will fit snugly in place on top of the primary scrubber housing 10 with the top or discharge end of the burner assembly being constructed so that the secondary scrubber housing 14 will fit snugly in place on top of the burner assembly housing 82.

The burner assembly is constructed to afford ease of operation with automatic ignition and all necessary safety features.

As can be expected the now purified gaseous vapors have absorbed the intense heat associated with the burner assembly and require cooling prior to their entry into the exhaust duct 15 and final emmission into the atmosphere as cooled, clean vapors.

The cleaned heated gases are cooled by the secondary scrubber section 300, which operates similarly to the primary scrubber section 100. On the secondary scrubber section baffle members 40 and 42 are secured to the secondary scrubber housing 14 to effect a serpentine path for the cleaned gases as they pass through the cold water fog discharged by spray means 23. The baffle members 40 form an inclined trough 41 which collects the condensible water vapors which are discharged from spray means 23 mounted to the housing.

The condensed liquid is deposited into a drain 20 which leads down to drain line, and out into a waste collection area. Baffle members 42 are preferably positioned above the baffle member 40 to assist in draining the condensed water vapors into trough 41 and channeling the upward rising heated cleaned gas into the spray fog bank discharged by the spray means 23. Access into the secondary scrubber housing is obtained by way of an access door 47. A viewing lens 49 is also provided in the housing 14 for observation purposes.

The main water supply as shown in FIG. 1 preferably runs from a ceiling of the building to solenoid valve 26 and pressure regulator 28 which are connected to the secondary scrubber housing 14. However, if desired, the solenoid valve and pressure regulator could be mounted in a similar space on the primary scrubber housing. The water passes from the supply means through conduit 27 without any significant temperature change but on its passage down towards the primary scrubber section 100 for discharge through spray means 30 the conduit makes a coil 29 out over the air stream directly above the burner assembly, so that temperature of the water is raised to between 140°–180°F. when it is discharged from spray means 30.

The secondary scrubber sections 300 is designed so that an exhaust duct can be attached at its discharge end as shown in FIG. 1. The other end of the exhaust duct can be connected to a suitable piece of equipment designed specifically as an exhauster which is located at right angles to the vehicle exhaust duct and is mounted on structural steel framing or other supports above the roof duct.

The exhaust duct air at a point above the roof is preferably equipped with an air compensator which is fully adjustable and affords a means of fresh air introduction. This fresh air introduction balances and aids in further reducing the temperature of the clean gaseous vapors prior to the final point of exit into the atmosphere.

While the preferred embodiment of the invention has been disclosed, it is understood that the invention is not limited to such an embodiment, since it may be otherwise embodied in the scope of the appended claims.

What is claimed is:

1. An improved air scrubber apparatus comprising a primary scrubber, said primary scrubber comprising a housing, a first nozzle spray means mounted within said housing, a plurality of baffle members secured inside said housing to provide a serpentine gaseous flow path for slowing the velocity of gases passing therethrough and to direct liquid discharged from said nozzle means into a disposal means, a burner means connected to said primary air scrubber housing and positioned above said primary air scrubber housing, said burner means comprising a housing, fuel combustion apparatus mounted to said housing, said fuel combustion apparatus comprising a burner manifold, burner tubes leading from said manifold and a source of fuel leading to said manifold, and a heat disseminating screen connected to said burner housing and positioned in said housing said screen being constructed to carry heat emanating from the burner tubes over an area in the interior of the burner housing, a secondary scrubber positioned above said burner housing, said secondary scrubber comprising a housing connected to said burner housing a second nozzle spray means mounted within said second scrubber housing said second nozzle spray means being adapted to spray liquid into said secondary scrubber housing, a plurality of baffle members secured inside said second scrubber housing to provide a serpentine gaseous flow path and to direct liquid discharged from said second nozzle spray means into said disposal means.

2. An air scrubber apparatus as claimed in claim 1, wherein each of said baffle members are angularly positioned with respect to the planes of the respective housing walls.

3. An apparatus as claimed in claim 1 wherein said screen is secured to the burner tubes of said fuel combustion apparatus.

4. Apparatus as claimed in claim 1 wherein said burner means housing has a plurality of apertures therein allowing combustion air to enter therein.

5. An improved air scrubber apparatus for a cooking mechanism comprising a primary air scrubber, said primary air scrubber comprising a housing, a plurality of baffle members secured to said housing and projecting inwardly from said housing walls to provide a substantially serpentine path for the flow of gases rising therethrough, slowing the velocity of said gases, liquid carrying means mounted to said housing, a spray means connected to said liquid carrying means said spray means being positioned inside said housing and fire extinguisher discharge means mounted to said housing, a burner means connected to and positioned above said primary air scrubber housing, said burner means comprising a housing, heat generating means connected to said housing, said heat generating means comprising a burner manifold, a plurality of burner tubes leading from said manifold, a source of fuel leading to said manifold and a heat dissiminating screen connected to said heat generating means, a secondary scrubber connected to and positioned above said burner means housing, said secondary scrubber comprising a housing, a second spray means positioned inside said secondary scrubber housing, a second liquid carrying means mounted to said secondary scrubber housing, said second liquid carrying means being connected to said second spray means, said first liquid carrying means comprising a conduit means and heat transfer means, said heat transfer means comprising a loop means positioned over said heat generating means, said loop means being connected to said spray means in said primary scrubber so that liquid being carried through said loop means is heated by said heat generating means to maintain liquid carried by said liquid carrying means at a temperature which efficiently acts on grease laden gases, a plurality of baffle members secured to said secondary scrubber housing, and positioned within said secondary scrubber housing to prevent the straight through flow of gases arising from said heat generating means, said baffle members in said secondary scrubber comprising at least one angularly shaped baffle member secured to said housing, said at least one angularly shaped baffle member being adapted to drain fluid out of said housing and a plurality of upper baffle members positioned above said at least one angularly shaped member, said plurality of baffle members being positioned to channel upwardly rising gas along a substantially serpentine path toward said spray means and to assist in draining liquid discharged from said second spray means out of said housing.

6. Apparatus as claimed in claim 5, wherein said secondary scrubber housing has an access door and a viewing lens mounted thereto.

7. Apparatus as claimed in claim 5 wherein solenoid means controls the flow of water through said liquid carrying means and is activated when said cooking mechanism is activated.

8. An air scrubber apparatus as claimed in claim 5 wherein said heat disseminating screen is constructed of an incoloy steel mesh.

9. An air scrubber apparatus as claimed in claim 5 wherein the liquid being carried by said loop means over said heat generating means is heated so that the temperature of the liquid discharged from said primary scrubber spray means is in the range of 140°–180°F.

10. An air scrubber apparatus as claimed in claim 5 wherein said at least one angularly shaped baffle member is a trough shaped member.

* * * * *